(12) United States Patent
Kuramoto (10) Patent No.: US 8,339,611 B2
(45) Date of Patent: Dec. 25, 2012

(54) INTERFEROMETRIC DISTANCE MEASUREMENT WITH HARMONIC FREQUENCY COMB GENERATED BEAMS

(75) Inventor: Yoshiyuki Kuramoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 12/609,976

(22) Filed: Oct. 30, 2009

(65) Prior Publication Data

US 2010/0110444 A1 May 6, 2010

(30) Foreign Application Priority Data

Nov. 4, 2008 (JP) ................................. 2008-283731

(51) Int. Cl.
*G01B 9/02* (2006.01)
(52) U.S. Cl. ........................................ 356/486; 356/498
(58) Field of Classification Search .......... 356/484–490, 356/496–516, 482
See application file for complete search history.

(56) References Cited

U.S. PATENT DOCUMENTS 7,898,669 B2 * 3/2011 Kim et al. ..................... 356/486

FOREIGN PATENT DOCUMENTS

JP 11-044504 A 2/1999

OTHER PUBLICATIONS

Minoshima, Kaoru, et al., High-accuracy measurement of 240-m distance in an optical tunnel by use of a compact femtosecond laser, Oct. 20, 2000, vol. 30, No. 30, Applied Optics, 5512-5517, XP-000981158.
Salvade, Yves, et al., High-accuracy absolute distance measurement using frequency comb referenced multiwavelength source, May 10, 2008, vol. 47, No. 14, Applied Optics, 2715-2720, XP-002557438.
Rovati, L., et al., "Absolute distance measurement using comb-spectrum interferometry", 1998 IOP Publishing Ltd, J. Opt. 29, 1998, 121-127, XP-002572558.

* cited by examiner

*Primary Examiner* — Hwa Lee
(74) *Attorney, Agent, or Firm* — Canon U.S.A., Inc., IP Division (57) ABSTRACT

The present invention provides a measurement apparatus which measures a distance between a reference surface fixed on a fiducial surface and a test surface located on a test object, the apparatus including an optical frequency comb generation unit configured to generate a light beam with a plurality of optical frequency components, which have equal optical frequency separations therebetween, a detection unit configured to, for at least two of the plurality of optical frequency components, detect an interference signal between a light beam reflected by the reference surface and a light beam reflected by the test surface to detect a phase corresponding to an optical path length between the reference surface and the test surface, and a calculation unit configured to calculate a geometric distance between the reference surface and the test surface based on the phases detected by the detection unit.

13 Claims, 5 Drawing Sheets

INTERFEROMETRIC DISTANCE MEASUREMENT WITH HARMONIC FREQUENCY COMB GENERATED BEAMS

BACKGROUND OF THE INVENTION

1. Field of the Invention

The present invention relates to a measurement apparatus.

2. Description of the Related Art

A light wave interferometric measurement apparatus (to be simply referred to as a "measurement apparatus" hereinafter) has been conventionally employed to measure the geometric distance of the optical path between a reference surface and a test surface (that distance assuming that the reference surface and the test surface have a vacuum space between them).

Figure 10:
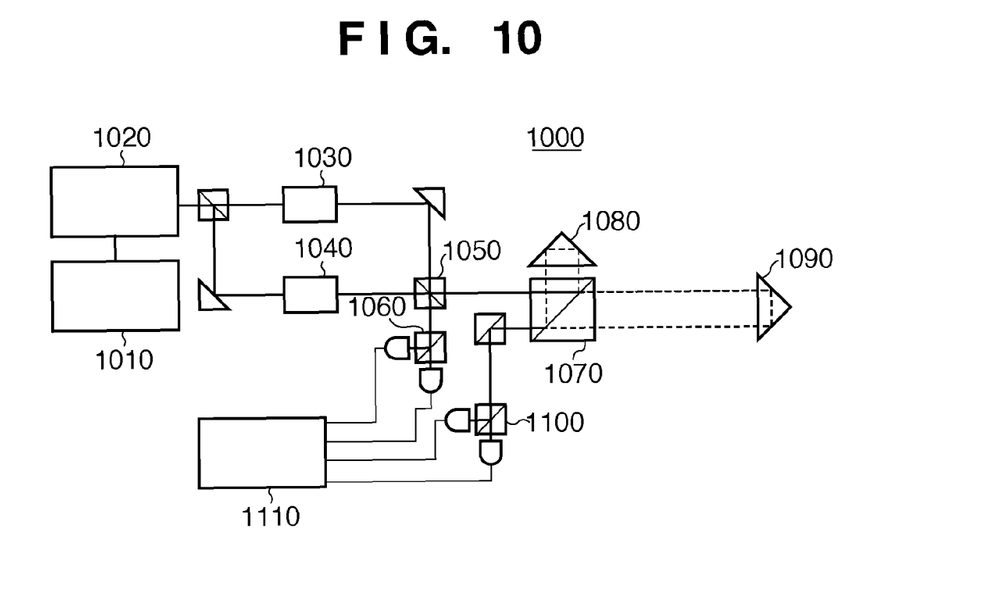
FIG. 10 is a block diagram showing the arrangement of a measurement apparatus (specifically, a light wave interferometric measurement apparatus).

A measurement apparatus 1000 having a correction function for a fluctuation in refractive index will be explained with reference to FIG. 10. A light beam (specifically, a light beam having a wavelength stabilized with high accuracy) from a light source 1010 enters a wavelength conversion unit 1020. The wavelength conversion unit 1020 generates not only the optical frequency component (i.e. a fundamental harmonic component) of the incident light beam but also an optical frequency component (i.e. the second harmonic component) that is double the fundamental harmonic component. The fundamental harmonic component of the light beam emerging from the wavelength conversion unit 1020 is transmitted through a color separating mirror (or beam splitter), and the second harmonic component of that light beam is reflected by the color separating mirror.

The fundamental harmonic component of the light beam transmitted through the color separating mirror enters a frequency shift unit 1030. The frequency shift unit 1030 generates a light beam which has a different (in this case, perpendicular) polarization from that of the incident light beam, and an optical frequency shifted by a small amount from that of the incident light beam. The frequency shift unit 1030 outputs the generated light beam onto the same optical axis as that of the incident light beam. The light beam emerging from the frequency shift unit 1030 strikes a non-polarizing beam splitter 1050 after being deflected by a mirror.

In contrast, the second harmonic component of the light beam reflected by the color separating mirror enters a frequency shift unit 1040. Similarly to the frequency shift unit 1030, the frequency shift unit 1040 generates a light beam which has a different (in this case, perpendicular) polarization from that of the incident light beam, and an optical frequency shifted by a small amount from that of the incident light beam. The frequency shift unit 1040 outputs the generated light beam onto the same optical axis as that of the incident light beam. The light beam emerging from the frequency shift unit 1040 strikes the non-polarizing beam splitter 1050.

The optical frequency component emerging from the wavelength conversion unit 1020 will be referred to as a light source frequency component hereinafter, and those generated by the frequency shift units 1030 and 1040 will be referred to as frequency-shifted components hereinafter.

A portion of the fundamental harmonic component is transmitted through the non-polarizing beam splitter 1050, and a portion of the second harmonic component is reflected by the non-polarizing beam splitter 1050 and these two portions reach a reference signal detection unit 1060 including a color separating mirror, polarizer, and detector. The reference signal detection unit 1060 performs heterodyne detection of an interference signal (which will be a reference signal) between the light source frequency component and frequency-shifted component for each of the fundamental harmonic component and the second harmonic component.

On the other hand, the portion of the fundamental harmonic component that is reflected by the non-polarizing beam splitter 1050, and the portion of the second harmonic component that is transmitted through the non-polarizing beam splitter 1050 reach a different polarizing beam splitter 1070. The polarizing beam splitter 1070 transmits a light beam having a polarization component parallel to its reflecting surface, and reflects a light beam having a polarization component perpendicular to its reflecting surface.

Both the fundamental harmonic component and second harmonic component of the light source frequency component are adjusted so as to have a polarization component parallel to the reflecting surface of the polarizing beam splitter 1070. Hence, the light source frequency component strikes a test surface 1090 after being transmitted through the polarizing beam splitter 1070. Also, both the fundamental harmonic component and second harmonic component of the frequency-shifted component are adjusted so as to have a polarization component perpendicular to the reflecting surface of the polarizing beam splitter 1070. Hence, the frequency-shifted component strikes a reference surface 1080 after being reflected by the polarizing beam splitter 1070.

The reference surface 1080 and test surface 1090 each form a so-called corner-cube reflector including a plurality of reflecting surfaces. For this reason, the light beams reflected by the reference surface 1080 and test surface 1090 each emerge from a position shifted from the incident position at the same angle as the incident angle. The light beam from the test surface 1090 enters a test signal detection unit 1100 after being transmitted through the polarizing beam splitter 1070. The light beam from the reference surface 1080 also enters the test signal detection unit 1100 after being reflected by the polarizing beam splitter 1070.

The test signal detection unit 1100 includes a color separating mirror, polarizer, and detector. The test signal detection unit 1100 performs heterodyne detection of an interference signal (i.e. a test signal as opposed to the reference signal) between the light source frequency component reflected by the test surface 1090 and the frequency-shifted component reflected by the reference surface 1080.

The phase difference of the test signal detected by the test signal detection unit 1100 with respect to the reference signal detected by the reference signal detection unit 1060 changes in accordance with the difference in optical path length between the reference surface 1080 and the test surface 1090. Hence, a calculation unit 1110 can calculate the differences in optical path length of the fundamental harmonic component and second harmonic component.

Differences in optical path length $OP(f_1)$ and $OP(f_2)$ of the fundamental harmonic component and second harmonic component respectively, are given by:

$$OP(f_1) = [1 + N_{tp} \cdot B(f_1)]D \qquad (1)$$

$$OP(f_2) = [1 + N_{tp} \cdot B(f_2)]D \qquad (2)$$

where D is the difference between the geometric distance of the optical path of the light beam (frequency-shifted component) reflected by the reference surface and the geometric distance of the optical path of the light beam (light source frequency component) reflected by the test surface, from when the light beam is divided by the polarizing beam splitter 1070 until it is combined by the polarizing beam splitter 1070, $f_1$ is the optical frequency of the fundamental harmonic component, $f_2$ is the optical frequency of the second harmonic component, $N_{tp}$ is a component which depends on the density of the medium in an optical path between the reference surface and the test surface, and $B(f_1)$ and $B(f_2)$ are functions which depend only on the wavelength.

From equations (1) and (2), the geometric distance D is given by:

$$D=OP(f_1)-A(OP(f_2)-OP(f_1)) \quad (3)$$

where $A=B(f_1)/(B(f_2)-B(f_1))$ and is commonly called the coefficient A.

Japanese Patent Laid-Open No. 11-44504 discloses details of such a technique of calculating a geometric distance from the differences in the optical path length (data) of two wavelengths. Japanese Patent Laid-Open No. 11-44504 achieves stable measurement that is independent of a fluctuation in refractive index of the medium by calculating the geometric distance D from the differences in optical path length of the fundamental harmonic component and second harmonic component.

Unfortunately, the prior art poses a problem in that the measurement accuracy of the geometric distance D is difficult to improve because the measurement accuracy depends on the coefficient A. For example, although a reduction in coefficient A can improve the measurement accuracy, it makes it necessary to increase the wavelength difference. This, in turn, makes it difficult to guarantee the precision of a polarizer, resulting in periodic errors of the optical path length. Another problem is that the coefficient A is more than 10 or 20 even at a minimum in a typical wavelength range and is therefore inevitably prone to be large when compared to the measurement accuracy of the optical path length.

Still another problem is that the difference in optical path length measured actually has an uncertainty of an integer multiple of the wavelength. Therefore, to determine the absolute value of the geometric distance D, it is necessary to measure the geometric distance D with an accuracy that equals a wavelength on the order of submicrons or less. This means that absolute value determination is practically impossible.

SUMMARY OF THE INVENTION

It is desired to provide a measurement apparatus which can measure the geometric distance of the optical path between a reference surface and a test surface with high accuracy.

According to one aspect of the present invention, there is provided a measurement apparatus configured to measure a distance between a reference surface fixed on a fiducial surface and a test surface located on a test object, the apparatus including an optical frequency comb generation unit configured to generate a light beam with a plurality of optical frequency components, which have equal optical frequency separations therebetween, a detection unit configured, for at least two of the plurality of optical frequency components, to detect an interference signal between a portion of the light beam reflected by the reference surface and a portion of the light beam reflected by the test surface to detect a phase corresponding to an optical path length between the reference surface and the test surface, and a calculation unit configured to calculate a geometric distance between the reference surface and the test surface based on the phases detected by the detection unit, wherein for each of the plurality of optical frequency components, the calculation unit is configured to calculate the geometric distance by converting the phase detected by the detection unit into an optical path length, and fitting a function to the optical path length, and wherein the function is expressed by multiplying the refractive index of a medium, which is present between the reference surface and the test surface and has a known dispersion characteristic, by the geometric distance.

Further features of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

First Embodiment

Figure 1:
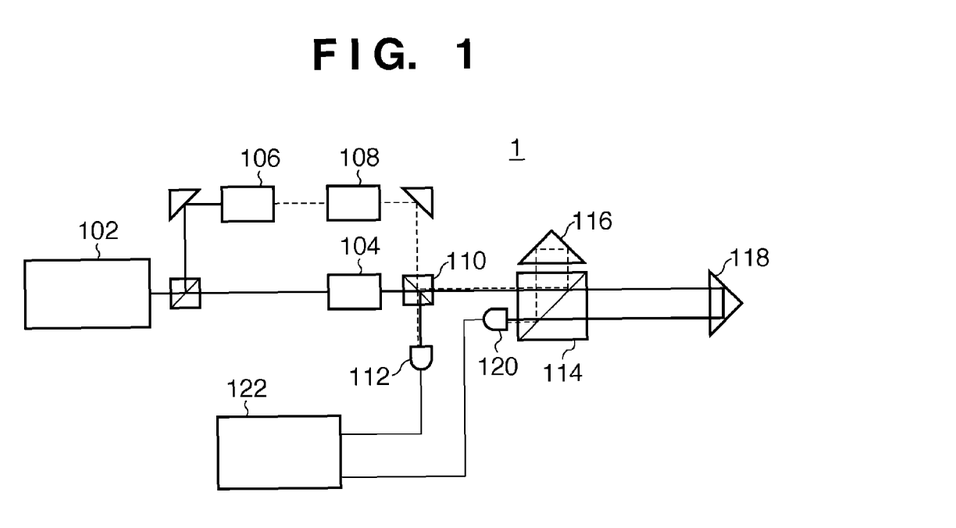
FIG. 1 is a block diagram showing the arrangement of a measurement apparatus according to one aspect of the present invention.

FIG. 1 is a block diagram showing the arrangement of a measurement apparatus 1 according to the first embodiment. The measurement apparatus 1 is a light wave interferometric measurement apparatus which measures the distance between a reference surface fixed on a fiducial surface and a test surface located on a test object. As shown in FIG. 1, the measurement apparatus 1 includes a light source 102, optical frequency comb generation unit (first unit) 104, frequency shifter 106, and optical frequency comb generation unit (second unit) 108. The measurement apparatus 1 also includes a non-polarizing beam splitter 110, reference signal detection unit 112, polarizing beam splitter 114, test signal detection unit 120, and calculation unit 122. Although the measurement apparatus 1 includes one set of optical frequency comb generation units, it may include more than one set.

A light beam (specifically, a light beam having a wavelength stabilized with high accuracy), which has an optical frequency $f_1$ and is emitted by the light source 102 serving as a continuous wave light source, is split into two light sub-beams. One of these two sub-beams enters the optical frequency comb generation unit 104.

The optical frequency comb generation unit 104 includes an electro-optical modulation element and resonator. The optical frequency comb generation unit 104 drives the electro-optical modulation element in accordance with a driving frequency from an oscillator (not shown) to generate an optical frequency comb. The generated optical frequency comb has a comb-like optical frequency spectrum with a frequency separation $f_m$ and the optical frequency $f_1$ as the center. In this embodiment, the light beam emerging from the optical frequency comb generation unit 104 will be referred to as an optical frequency comb OC1.

The other sub-beam which is split from the light beam emitted by the light source 102 has its optical frequency converted into $f_1 + \Delta f$ by the frequency shifter 106 including an acousto-optical element, and enters the optical frequency comb generation unit 108.

The optical frequency comb generation unit 108 drives the electro-optical modulation element in accordance with a driving frequency from an oscillator (not shown) to generate an optical frequency comb. The generated optical frequency comb has a comb-like optical frequency spectrum with a frequency interval $f_m + \Delta f_m$ and the optical frequency $f_1 + \Delta f$ as the center. In this embodiment, the light beam emerging from the optical frequency comb generation unit 108 will be referred to as an optical frequency comb OC2. The optical frequency combs OC1 and OC2 have orthogonal polarizations.

The optical frequency comb generation units 104 and 108 generate the optical frequency combs OC1 and OC2 having different center optical frequencies and optical frequency separations.

In this embodiment, a light beam from the light source 102 serving as a continuous wave light source undergoes phase modulation to generate an optical frequency comb. However, it is also possible to directly generate an optical frequency comb from a laser resonator. In this case, the optical frequency interval is generally narrow. To compensate for this, it is possible to perform frequency filtering using, for example, an etalon as needed.

The optical frequency combs OC1 and OC2 strike the non-polarizing beam splitter 110 and are coaxially superposed on each other. The superposed light beam is then split into two light sub-beams again at non-polarizing beam splitter 110. One of the two sub-beams split by the non-polarizing beam splitter 110 reaches the reference signal detection unit 112 including a polarizer and detector. The reference signal detection unit 112 detects an interference signal (reference signal) which changes in accordance with the difference in optical path length between the optical frequency combs OC1 and OC2 along the route to the detector.

The other sub-beam split by the non-polarizing beam splitter 110 strikes the polarizing beam splitter 114. The polarizing beam splitter 114 transmits a sub-beam portion having a polarization component parallel to its reflecting surface, and reflects a sub-beam portion having a polarization component perpendicular to its reflecting surface.

The optical frequency comb OC1 is adjusted so as to have a polarization component parallel to the reflecting surface of the polarizing beam splitter 114. Hence, the optical frequency comb OC1 strikes a test surface 118 after being transmitted through the polarizing beam splitter 114. Also, the optical frequency comb OC2 is adjusted so as to have a polarization component perpendicular to the reflecting surface of the polarizing beam splitter 114. Hence, the optical frequency comb OC2 strikes a reference surface 116 after being reflected by the polarizing beam splitter 114.

The reference surface 116 and test surface 118 each form a so-called corner-cube reflector including a plurality of reflecting surfaces. For this reason, the light beams reflected by the reference surface 116 and test surface 118 each emerge from a position shifted from the incident position at the same angle as the incident angle. The light beam from the test surface 118 reaches the test signal detection unit 120 after being transmitted through the polarizing beam splitter 114. The light beam from the reference surface 116 also reaches the test signal detection unit 120 after being reflected by the polarizing beam splitter 114.

Like the reference signal detection unit 112, the test signal detection unit 120 includes a polarizer and detector. The test signal detection unit 120 detects an interference signal (test signal) between the optical frequency comb OC1 reflected by the test surface 118 and the optical frequency comb OC2 reflected by the reference surface 116.

In this manner, the reference signal detection unit 112 detects an interference signal between optical frequency comb OC1 and optical frequency comb OC2; and the test signal detection unit 120 detects an interference signal between the optical frequency comb OC2 reflected by the reference surface 116 and the optical frequency comb OC21 reflected by the test surface 118. The two signal detection units 112 and 120 combine results to detect a phase corresponding to the distance between the reference surface 116 and the test surface 118.

Based on the phase corresponding to the distance between the reference surface 116 and the test surface 118, the calculation unit 122 calculates the geometric distance between the reference surface 116 and the test surface 118 (that distance assuming that the reference surface 116 and the test surface 118 have a vacuum space between them), as will be described later. For example, for each of a plurality of optical frequency components, the calculation unit 122 converts the phase detected by the reference signal detection unit 112 and test signal detection unit 120 into an optical path length assuming that the reference surface 116 and the test surface 118 have a vacuum space between them. The calculation unit 122 then fits a function to the converted optical path length to calculate the geometric distance between the reference surface 116 and the test surface 118. The function fitted to the optical path length is herein expressed by multiplying the refractive index of the medium, which is present between the reference surface and the test surface and has a known dispersion characteristic, by the geometric distance between the reference surface and the test surface. The calculation unit 122 can also calculate the refractive index of the medium between the reference surface 116 and the test surface 118, as will be described later.

A process of calculating the geometric distance between the reference surface 116 and the test surface 118 by the calculation unit 122 will be explained in detail below.

A reference signal $I_{ref}$ detected by the reference signal detection unit 112, and a test signal $I_{test}$ detected by the test signal detection unit 120 are respectively given by:

$$I_{ref} = \sum_{p=-n}^{n} a1_p a2_p \cos\left(2\pi(\Delta f + p \cdot \Delta f_m)t - 2\pi(f + p \cdot f_m)\frac{L_1 n_1}{c}\right) \quad (4)$$

$$I_{test} = \sum_{p=-n}^{n} a1_p a2_p \cos\left(2\pi(\Delta f + p \cdot \Delta f_m)\left(t - \frac{L_2 n_2}{c}\right) - 2\pi(f + p \cdot f_m)\frac{L_1 n_1 + D \cdot n}{c}\right) \quad (5)$$

where $a1_p$ is the amplitude of the $p^{th}$ frequency component of the optical frequency comb OC1, $a2_p$ is the amplitude of the $p^{th}$ frequency component of the optical frequency comb OC2, $L_1n_1$ is the difference in optical path length for each of the optical frequency combs OC1 and OC2 from the optical frequency comb generation units 104,108 to the reference signal detection unit 112, $L_2n_2$ is the difference between the optical path length of the optical frequency comb OC1 from the non-polarizing beam splitter 110 to the test signal detection unit 120 and the optical path length of the optical frequency comb OC1 from the non-polarizing beam splitter 110 to the reference signal detection unit 112, and D·n is the difference in optical path length between the optical frequency combs OC1 and OC2 along the route from the polarizing beam splitter 114 to the test signal detection unit 120.

Let $\Delta f + p \cdot \Delta f_m$ be the $p^{th}$ frequency component of the interference signal. Then, this interference component is an interference signal between a $p^{th}$ optical frequency component $f + p \cdot f_m$ of the optical frequency comb OC1 and a $p^{th}$ optical frequency component $f + \Delta f + p \cdot (f_m + \Delta f_m)$ of the optical frequency comb OC2.

Figure 2:
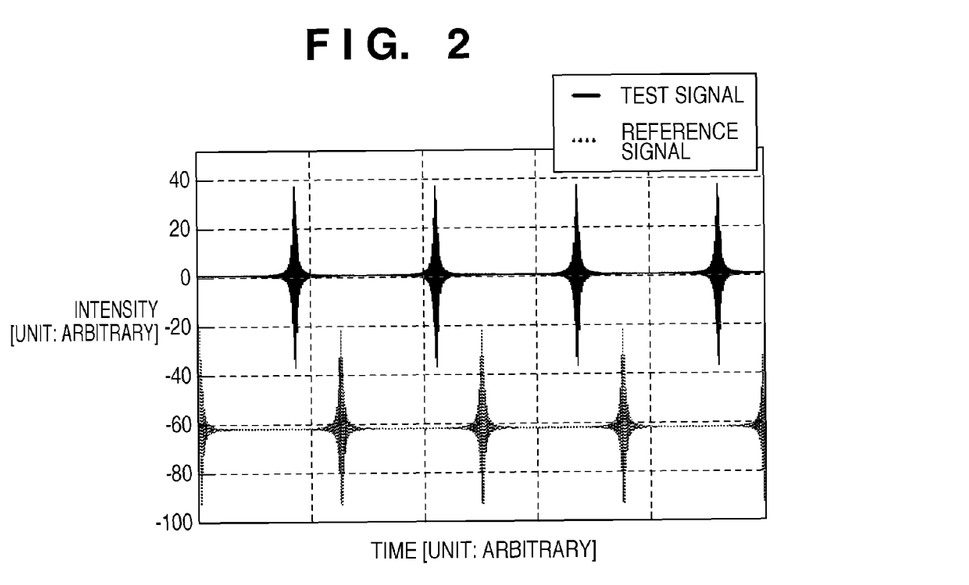
FIG. 2 is a graph showing temporal changes of a reference signal detected by a reference signal detection unit and of a test signal detected by a test signal detection unit in the measurement apparatus shown in FIG. 1.

FIG. 2 is a graph showing temporal changes of a reference signal detected by the reference signal detection unit 112 and of a test signal detected by the test signal detection unit 120. An interference signal between these two signals is a pulse signal having a repetition frequency $\Delta f_m$ as the difference in frequency interval between the optical frequency combs OC1 and OC2. In this interference signal, a delay time occurs between the reference signal and the test signal in accordance with the difference in optical path length between the reference surface 116 and the test surface 118.

Figure 3:
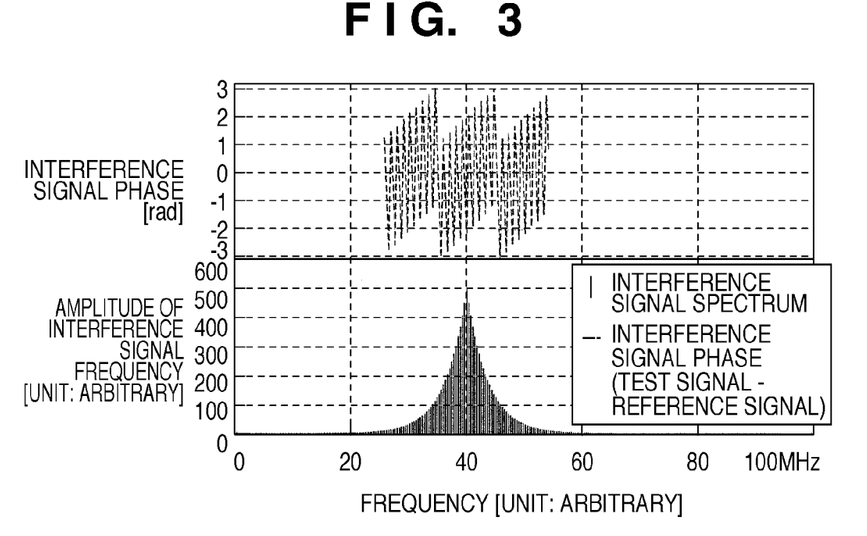
FIG. 3 is a graph showing the Fourier transform of an interference signal between the signals shown in FIG. 2.

FIG. 3 shows the Fourier transform of an interference signal between the signals shown in FIG. 2. Signal components are detected at the frequency interval $\Delta f_m$ such that the interference signal spectrum has a frequency (carrier frequency) $\Delta f$ at the center. Thus, heterodyne detection of optical frequency components respectively corresponding to the detected components is implemented by calculating the phases of the detected components.

An optical path length (measurement result) $OP(f_p)$ for an optical frequency $f_p$ is given by:

$$OP(f_p) = [1 + N_{tp} \cdot B(f_p)] D \quad (6)$$

where D is the difference between the geometric distance of the optical path of the optical frequency comb OC1 and the geometric distance of the optical path of the optical frequency comb OC2, from when the light beam is divided by the polarizing beam splitter 114 until it is combined by the polarizing beam splitter, $N_{tp}$ is a component which depends on the density of a medium in an optical path between the reference surface and the test surface, and B(f) is a function which depends only on the wavelength of the light beam. Note that the known dispersion characteristic of the medium between the reference surface and the test surface is approximated by the sum of the refractive index of the medium in a vacuum and the product of a component which depends on the medium density and a component which depends on the optical frequency component, as seen from equation (6).

Assume that the medium in an optical path between the reference surface and the test surface is air with zero humidity. Then, the function B(f) is given by an Edlen equation:

$$B(f) = 10^{-8}(8342.54 + 2406147/(130.0 - (10^{-6}f/c)^2) + 15998/(38.9 - (10^{-6}f/c)^2)) \quad (7)$$

If the medium between the reference surface and the test surface has a condition different from the above-described condition, an appropriate function may be set.

The difference in optical path length which is actually measured by the measurement apparatus 1 has an ambiguity of an integer multiple of each wavelength, so the absolute value of the optical path length is corrected as needed. For example, assume that the geometric distance D is known with an accuracy $\Delta D$; $D = D' \pm \Delta D$. Also, let $\Delta \phi$ be the phase difference between the measurement results of two adjacent optical frequencies. Then, an order of interference n1 between optical frequency combs, an order of interference n2 between light waves for the optical frequency $f_p$, a detection phase $\phi_{meas}(f_p)$ for the optical frequency $f_p$, and an optical path length $OP_{meas}(f_p)$ for the optical frequency $f_p$ are given by:

$$n1 = \text{round}\left(\left(D' - \frac{\Delta \phi}{2\pi}\frac{c}{f_m}\right) \bigg/ \frac{c}{f_m}\right) \quad (8)$$

$$n2 = \text{round}\left(\left(\frac{\Delta \phi}{2\pi}\frac{c}{f_m} - \frac{\phi(f_p)}{2\pi}\frac{c}{f_p}\right) \bigg/ \frac{c}{f_p}\right) \quad (9)$$

$$\phi_{meas}(f_p) = \phi(f_p) + 2\pi\left(n1\frac{f_p}{f_m} + n2\right) \quad (10)$$

$$OP_{meas}(f_p) = \frac{\phi_{meas}(f_p)}{2\pi}\frac{c}{f_p} \quad (11)$$

where, in equations (8) and (9), round( ) is a function which computes the arithmetic operation of rounding off the argument enclosed in parentheses to the nearest integer, and c is the velocity of light; and in equation (10), $\phi(f_p)$ is the phase difference of a test signal having the optical frequency $f_p$ with respect to a reference signal.

Figure 4:
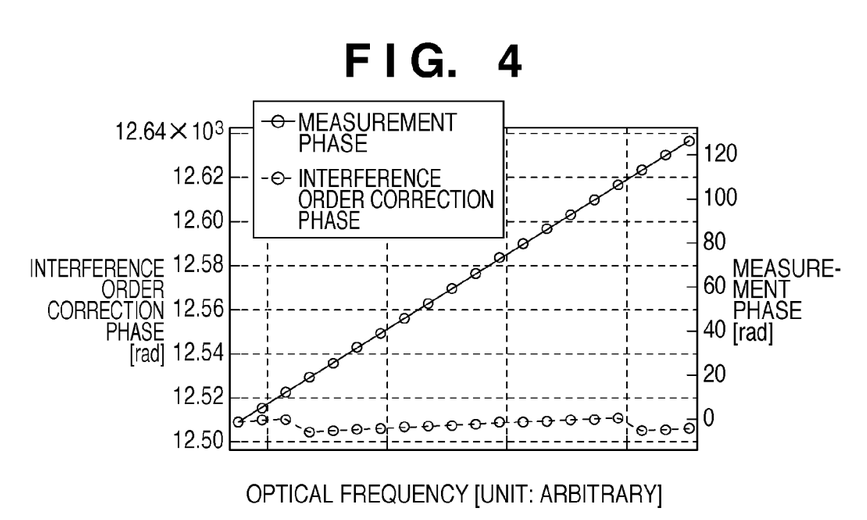
FIG. 4 is a graph showing the computation result of the order of interference between the signals shown in FIG. 2.

FIG. 4 is a graph showing the computation result of the order of interference. In FIG. 4, a broken line indicates the measurement phase, which is wrapped into $\pm \pi$. A phase after interference order correction (i.e. the interference order correction phase) is obtained, as indicated by a solid line, by applying equations (8) to (10) to the measurement phase.

As can be understood from equation (8), to precisely calculate the order of interference, the measurement accuracy $\Delta D$ of D' needs to be higher than a synthetic wavelength $c/f_m$ calculated from the optical frequency separation (an accuracy that equals a synthetic wavelength or less). In this regard, setting the frequency separation $f_m$ to several gigahertz allows the measurement accuracy $\Delta D$ to be of the order of several millimeters.

To correct a change in medium density from the optical path length measurement results for a plurality of wavelengths, the geometric distance D is calculated by fitting a given function to the optical path length measurement results. Letting $OP_{meas}(f_p)$ be the measured optical path length, a square sum J of a fitting residual is given by:

$$J = \sum_{i=1}^{n}\{OP_{meas}(f_i) - (D + N_{tp} \cdot D \cdot B(f_i))\}^2 \quad (12)$$

In view of this, D and $N_{tp} \cdot D$ that minimize the value of equation (12) can be determined by solving given normal equations.

Figure 5:
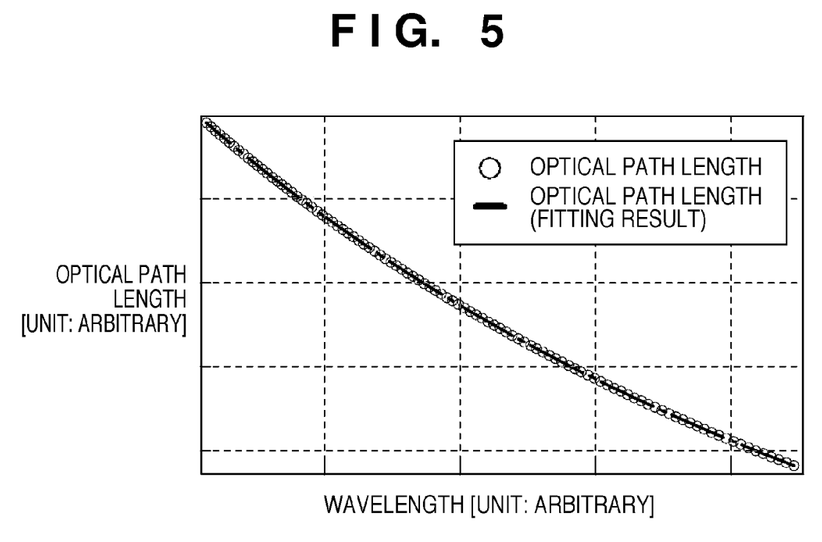
FIG. 5 is a graph showing the result of fitting a given function to the measured optical path length.

FIG. 5 shows the result of fitting a given function to the measured optical path length. Referring to FIG. 5, D and $N_{tp} \cdot D$ can be obtained by optimally approximating a discrete optical path length measurement result, indicated by open circles, using equation (6) indicated by an alternate long and short dashed line. Also, the refractive index of the medium between the reference surface and the test surface can be calculated where necessary by subtracting the geometric distance between the reference surface and the test surface from the optical path length measurement result for each optical frequency.

A light wave interferometric measurement apparatus is generally known to often generate an optical path length measurement result having cyclic errors with the periods of the measurement wavelength and its harmonic components due to factors associated with stray light attributed to, for example, a manufacturing error of a polarizer. Cyclic errors attributed to stray light are accounted for by the phase difference between the measurement light and the stray light. In view of this, such cyclic errors can be corrected by averaging a plurality of optical path lengths measured at equal phase difference intervals within the range of 0 to $2\pi$.

The phase of a light beam which has an optical frequency f and propagates through a distance L is given by $2\pi L \cdot f/c$. In an optical frequency comb having equal frequency intervals, the phases measured for respective optical frequencies have equal intervals between them. A phase difference of $2\pi$ or more is generated by setting the optical frequency range for use in measurement to be sufficiently wider than c/L. Thus, periodic error correction is implemented by selecting (setting) the optical frequency interval $f_m$ such that the plurality of measurement results fall within the phase range of $2\pi$. Note that when the optical frequency range is very wide, the degree of influence of periodic errors changes in accordance with the frequency range. In this case, therefore, the optical frequency interval $f_m$ needs to be selected (set) so as to satisfy the above-described condition within the range in which the degree of influence of periodic errors is approximately uniform (i.e., that degree falls within a predefined or acceptable tolerance).

In this manner, since the measurement apparatus 1 according to this embodiment not only exploits a simple average effect obtained by simultaneous measurement using a plurality of wavelengths, but also sets equal optical frequency separations for use in the measurement, it cancels cyclic errors attributed to, for example, a manufacturing error of a polarizer. Hence, the measurement apparatus 1 can measure (calculate) the geometric distance D with high accuracy.

Also, the measurement apparatus 1 can measure (determine) the absolute value of the geometric distance D with high accuracy by eliminating any uncertainty of an integer multiple of each wavelength, as long as the geometric distance D is roughly known in advance with an accuracy of the order of several millimeters.

Second Embodiment

Figure 6:
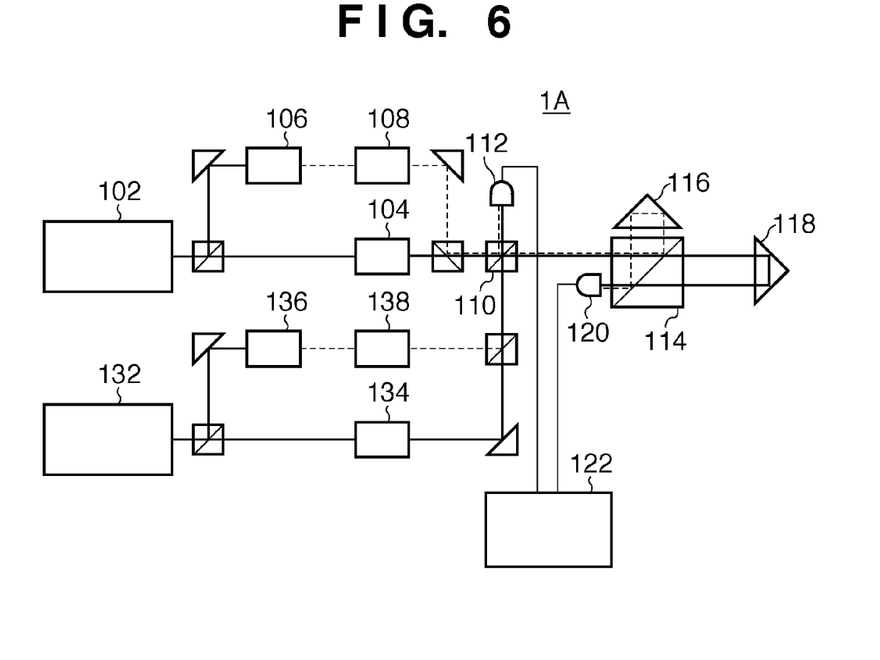
FIG. 6 is a block diagram showing the arrangement of a measurement apparatus according to a second embodiment of the present invention.

FIG. 6 is a block diagram showing the arrangement of a measurement apparatus 1A according to the second embodiment. The measurement apparatus 1A is a light wave interferometric measurement apparatus which measures the distance between a reference surface fixed on a fiducial surface and a test surface located on a test object. The measurement apparatus 1A includes a plurality of sets of optical frequency comb generation units. One set includes two units which generate light beams having different center optical frequencies and optical frequency separations.

As shown in FIG. 6, the measurement apparatus 1A includes a light source 102, optical frequency comb generation unit 104, frequency shifter 106, and optical frequency comb generation unit 108. The measurement apparatus 1A also includes a non-polarizing beam splitter 110, reference signal detection unit 112, polarizing beam splitter 114, test signal detection unit 120, and calculation unit 122. The measurement apparatus 1A also includes a light source 132, optical frequency comb generation unit 134, frequency shifter 136, and optical frequency comb generation unit 138.

A light beam (specifically, a light beam having a wavelength stabilized with high accuracy), which has an optical frequency $f_1$ and is emitted by the light source 102 serving as a continuous wave light source, is split into two light sub-beams. One of these two light sub-beams enters the optical frequency comb generation unit 104.

The optical frequency comb generation unit 104 generates an optical frequency comb having a comb-like optical frequency spectrum with a frequency interval $f_{m1}$ and the optical frequency $f_1$ as the center. In this embodiment, the light beam emerging from the optical frequency comb generation unit 104 will be referred to as an optical frequency comb OC1.

The other light sub-beam which was emitted by the light source 102 and was split has its optical frequency converted into $f_1 + \Delta f$ by the frequency shifter 106, and enters the optical frequency comb generation unit 108.

The optical frequency comb generation unit 108 generates an optical frequency comb having a comb-like optical frequency spectrum with a frequency interval $f_{m1} + \Delta f_m$ and an optical frequency $f_1 + \Delta f_1$ as the center. In this embodiment, the light beam emerging from the optical frequency comb generation unit 108 will be referred to as an optical frequency comb OC2. The optical frequency combs OC1 and OC2 have orthogonal polarizations.

Further to the above, a light beam, which has a frequency $f_2$ different from the frequency $f_1$ and is emitted by the light source 132 serving as a continuous wave light source, is split into two light sub-beams. One of these two light sub-beams enters the optical frequency comb generation unit 134.

The optical frequency comb generation unit 134 generates an optical frequency comb having a comb-like optical frequency spectrum with a frequency interval $f_{m2}$ and the optical frequency $f_2$ as the center. In this embodiment, the light beam emerging from the optical frequency comb generation unit 134 will be referred to as an optical frequency comb OC3. The optical frequency comb OC3 has the same polarization as that of the optical frequency comb OC1.

The other light sub-beam which is emitted by the light source 132 and has been split has its optical frequency converted into $f_2 + \Delta f_2$ by the frequency shifter 136, and enters the optical frequency comb generation unit 138.

The optical frequency comb generation unit 138 generates an optical frequency comb having a comb-like optical frequency spectrum with a frequency interval $f_{m2} + \Delta fm$ and the optical frequency $f_2 + \Delta f_2$ as the center. In this embodiment, the light beam emerging from the optical frequency comb generation unit 138 will be referred to as an optical frequency comb OC4. The optical frequency comb OC4 has the same polarization as that of the optical frequency comb OC2.

The optical frequency combs OC1 to OC4 strike the non-polarizing beam splitter 110 and are coaxially superposed on each other. The superposed light beam is split into two light beams again. One of the two light beams split by the non-polarizing beam splitter 110 reaches the reference signal detection unit 112. The reference signal detection unit 112 detects an interference signal (reference signal) which changes in accordance with the differences in optical path length between the optical frequency combs OC1 and OC2 and between the optical frequency combs OC3 and OC4 along the routes from the light sources 102 and 132 to the detector. An interference signal between light beams from the light sources 102 and 132 can be ignored when the optical frequency separation between light beams from the light sources 102 and 132 is sufficiently larger than the bandwidth of the detector in the reference signal detection unit 112.

The other light beam split by the non-polarizing beam splitter 110 strikes the polarizing beam splitter 114. The polarizing beam splitter 114 transmits a light beam having a polarization component parallel to its reflecting surface, and reflects a light beam having a polarization component perpendicular to its reflecting surface.

The optical frequency combs OC1 and OC3 are each adjusted so as to have a polarization component parallel to the reflecting surface of the polarizing beam splitter 114. Hence, the optical frequency combs OC1 and OC3 strike a test surface 118 after being transmitted through the polarizing beam splitter 114. The optical frequency combs OC2 and OC4 are each adjusted so as to have a polarization component perpendicular to the reflecting surface of the polarizing beam splitter 114. Hence, the optical frequency combs OC2 and OC4 strike a reference surface 116 after being reflected by the polarizing beam splitter 114.

The reference surface 116 and test surface 118 are each formed of a so-called corner-cube reflector including a plurality of reflecting surfaces. For this reason, the light beams reflected by the reference surface 116 and test surface 118 each emerge from a position shifted from the incident position at the same angle as the incident angle. The light beam from the test surface 118 reaches the test signal detection unit 120 after being transmitted through the polarizing beam splitter 114. The light beam from the reference surface 116 also reaches the test signal detection unit 120 after being reflected by the polarizing beam splitter 114.

The test signal detection unit 120 simultaneously detects an interference signal between the optical frequency combs OC1 and OC2 and that between the optical frequency combs OC3 and OC4, both of which change in accordance with the difference in optical path length between the reference surface 116 and the test surface 118. The interference signal detected by the test signal detection unit 120 will be referred to as a test signal hereinafter.

In this manner, the reference signal detection unit 112 and test signal detection unit 120 each detect an interference signal between the light beam reflected by the reference surface 116 and that reflected by the test surface 118 to detect a phase corresponding to the distance between the reference surface 116 and the test surface 118.

Based on the phase corresponding to the distance between the reference surface 116 and the test surface 118, the calculation unit 122 calculates the geometric distance between the reference surface 116 and the test surface 118, as will be described later.

A process of calculating the geometric distance between the reference surface 116 and the test surface 118 by the calculation unit 122 will be explained in detail below.

A reference signal $I_{ref}$ detected by the reference signal detection unit 112, and a test signal $I_{test}$ detected by the test signal detection unit 120 are respectively given by:

$$I_{ref} = \sum_{p=-n}^{n} a1_p a2_p \cos\left(2\pi(\Delta f_1 + p \cdot \Delta f_m)t - 2\pi(f_1 + p \cdot f_{m1})\frac{L_1 n_1}{c}\right) + \sum_{q=-n}^{n} a3_p a4_p \cos\left(2\pi(\Delta f_2 + q \cdot \Delta f_m)t - 2\pi(f_2 + q \cdot f_{m2})\frac{L_1 n_1}{c}\right) \quad (13)$$

$$I_{test} = \sum_{p=-n}^{n} a1_p a2_p \cos\left(2\pi(\Delta f_1 + p \cdot \Delta f_m)\left(t - \frac{L_2 n_2}{c}\right) - 2\pi(f_1 + p \cdot f_{m1})\frac{L_1 n_1 + D \cdot n}{c}\right) + \sum_{q=-n}^{n} a3_p a4_p \cos\left(2\pi(\Delta f_2 + q \cdot \Delta f_m)\left(t - \frac{L_2 n_2}{c}\right) - 2\pi(f_2 + q \cdot f_{m2})\frac{L_1 n_1 + D \cdot n}{c}\right) \quad (14)$$

Referring to equations (13) and (14), the interference signals formed using the light source 132 are added to equations (4) and (5) in the first embodiment with different center frequencies.

Let $\Delta f_1 + p\Delta f_m$ be the $p^{th}$ frequency component of the interference signal. Then, this interference component is an interference signal between a $p^{th}$ optical frequency component $f_1 + p \cdot f_{m1}$ of the optical frequency comb OC1 and a $p^{th}$ optical frequency component $f_1 + \Delta f_1 + p \cdot (f_{m1} + \Delta f_m)$ of the optical frequency comb OC2. Likewise, let $\Delta f_2 + q\Delta f_m$ be the $q^{th}$ frequency component of the interference signal. Then, this interference component is an interference signal between a $q^{th}$ optical frequency component $f_2 + q \cdot f_{m2}$ of the optical frequency comb OC3 and a $q^{th}$ optical frequency component $f_2 + \Delta f_2 + q(f_{m2} + \Delta f_m)$ of the optical frequency comb OC4. Thus, the individual frequency components of the interference signal turn into heterodyne signals formed by different optical frequencies. This implements optical path length measurement for the respective optical frequencies of the optical frequency combs OC1 and OC3.

Figure 7:
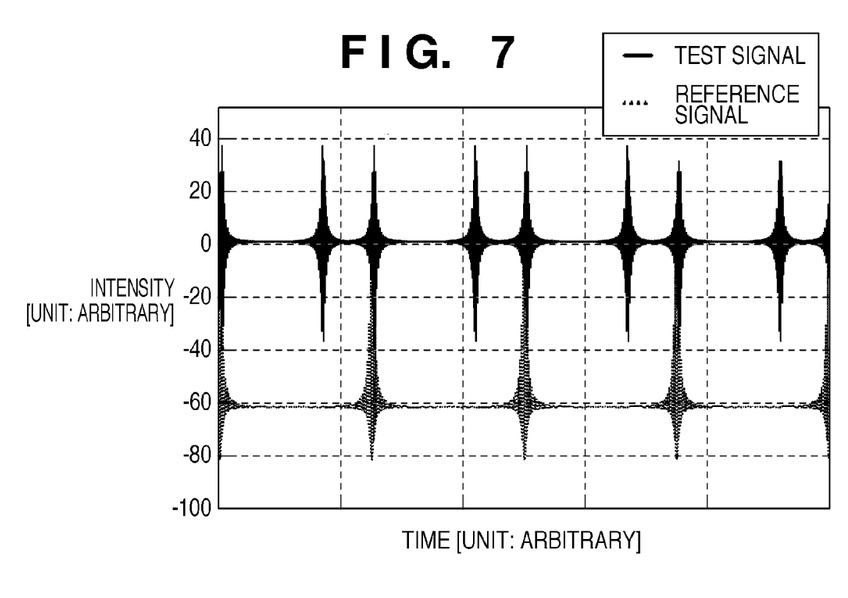
FIG. 7 is a graph showing temporal changes of a reference signal detected by a reference signal detection unit and of a test signal detected by a test signal detection unit in the measurement apparatus shown in FIG. 6.

FIG. 7 is a graph showing temporal changes of a reference signal detected by the reference signal detection unit 112 and of a test signal detected by the test signal detection unit 120. Pulse signals having equal periods can be obtained in the detection units 112 and 120 by setting the difference in optical frequency interval between the optical frequency combs OC1 and OC2 and that between the optical frequency combs OC3 and OC4 to be equal to each other.

Figure 8:
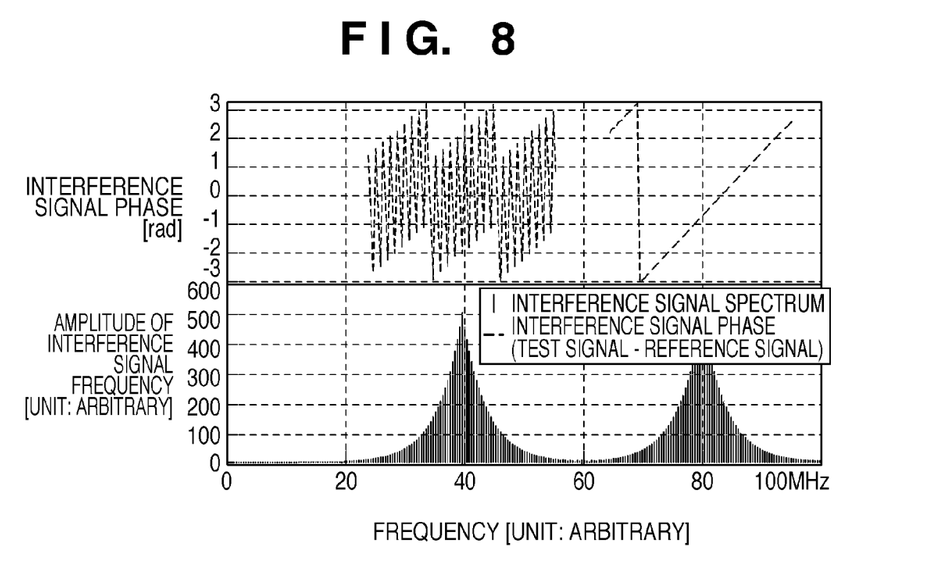
FIG. 8 is a graph showing the Fourier transform of an interference signal between the signals shown in FIG. 7.

FIG. 8 shows the Fourier transform of an interference signal between the signals shown in FIG. 7. An interference signal between the optical frequency combs OC1 and OC2 have a signal with a frequency interval $\Delta f_m$ and a frequency (carrier frequency) $\Delta f_1$ as the center. An interference signal between the optical frequency combs OC3 and OC4 have a signal with the frequency separation $\Delta f_m$ and a frequency (carrier frequency) $\Delta f_2$ as the center. Note that a carrier frequency separation $|\Delta f_2 - \Delta f_1|$ needs to be sufficiently larger than the bandwidths of the respective interference signals.

Taking account of the influences of not only the medium density but also the humidity, an optical path length (measurement result) OP(f) for an optical frequency f is given by:

$$OP(f) = [1 + N_{tp} \cdot B(f) + N_f \cdot C(f)]D \quad (15)$$

where D is the difference between the geometric distance of the optical path of the optical frequency comb OC1 (OC3) and the geometric distance of the optical path of the optical frequency comb OC2 (OC4), from when the light beam is divided by the polarizing beam splitter 114 until it is combined by the polarizing beam splitter, $N_{tp}$ is a component which depends on the density of the medium in an optical path between the reference surface and the test surface, B(f) is a function which depends only on the humidity, $N_f$ is a component which depends the humidity of the medium between the reference surface and the test surface and C(f) is a function which depends only on the wavelength. Note that the known dispersion characteristic of the medium between the reference surface and the test surface is approximated by the sum of the refractive index of the medium in a vacuum, the product between a component which depends on the medium density and that which depends on the optical frequency component, and the product of a component which depends on the medium humidity and that which depends on the optical frequency component, as seen from equation (15).

Assume that the medium in an optical path between the reference surface and the test surface is air. Then, the functions B(f) and C(f) are respectively given by Edlen equations:

$$B(f)=10^{-8}(8342.54+2406147/(130.0-(10^{-6}f/c)^2)+15998/(38.9-(10^{-6}f/c)^2)) \quad (16)$$

$$C(f)=(3.7345-0.0401(10^{-6}f/c)^2) \quad (17)$$

If the medium between the reference surface and the test surface has a condition different from the above-described condition, an appropriate function may be set.

The difference in optical path length which is actually measured by the measurement apparatus 1A has an ambiguity of an integer multiple of each wavelength, so the absolute value of the optical path length is corrected as needed. First, the order of interference for the synthetic wavelength (first synthetic wavelength) between the optical frequency combs OC1 and OC2 and that for the synthetic wavelength (second synthetic wavelength) between the optical frequency combs OC3 and OC4 are determined. Let $\Delta\phi1$ be the phase difference between two adjacent optical frequency components of an interference signal between the optical frequency combs OC1 and OC2, and $\Delta\phi2$ be the phase difference between two adjacent optical frequency components of an interference signal between the optical frequency combs OC3 and OC4. Then, an order of interference n1 between the optical frequency combs OC1 and OC2, and an order of interference n2 between the optical frequency combs OC3 and OC4 are determined as a set of minimum integers that satisfy:

$$f_{m2}\cdot n1=(\Delta\phi2\cdot f_{m1}-\Delta\phi1\cdot f_{m2})+f_{m1}\cdot n2 \quad (18)$$

For example, assume that $f_m'=f_{m1}'f_{m2}/(f_{m1}-f_{m2})$. Then, orders of interference n3, n4, and n5 for $f_m'$ are given by:

$$n3 = \text{round}\left(\left(D' - \left(\frac{\Delta\phi_1}{2\pi} + n_1\right)\frac{c}{f_{m1}}\right) / \frac{c}{f_m}\right) \quad (19)$$

$$n4 = \text{round}\left(\left(\frac{\Delta\phi_1}{2\pi}\frac{c}{f_{m1}} - \frac{\phi(f_p)}{2\pi}\frac{c}{f_p}\right) / \frac{c}{f_p}\right) \quad (20)$$

$$n5 = \text{round}\left(\left(\frac{\Delta\phi_2}{2\pi}\frac{c}{f_{m2}} - \frac{\phi(f_q)}{2\pi}\frac{c}{f_q}\right) / \frac{c}{f_q}\right) \quad (21)$$

Also, detection phases $\phi_{meas}(f_p)$ and $\phi_{meas}(f_q)$ for the frequencies $f_p$ and $f_q$, respectively, and optical path lengths $OP_{meas}(f_p)$ and $OP_{meas}(f_q)$ for the frequencies $f_p$ and $f_q$, respectively, are given by:

$$\phi_{meas}(f_p) = \phi(f_p) + 2\pi\left(n3\frac{f_p}{f_m} + n1\frac{f_p}{f_{m1}} + n4\right) \quad (22)$$

$$\phi_{meas}(f_q) = \phi(f_q) + 2\pi\left(n3\frac{f_q}{f_m} + n2\frac{f_q}{f_{m2}} + n5\right) \quad (23)$$

$$OP_{meas}(f_p) = \frac{\phi_{meas}(f_p)}{2\pi}\frac{c}{f_p} \quad (24)$$

$$OP_{meas}(f_q) = \frac{\phi_{meas}(f_q)}{2\pi}\frac{c}{f_q} \quad (25)$$

where, in equations (19) to (25), $f_p$ is the $p^{th}$ frequency component of an interference signal between the optical frequency combs OC1 and OC2, and $f_q$ is the $q^{th}$ frequency component of an interference signal between the optical frequency combs OC3 and OC4.

Note that the geometric distance D is known with an accuracy $\Delta D$; $D=D'\pm\Delta D$.

Referring to equation (19), the measurement accuracy $\Delta D$ of D' required to precisely calculate the order of interference is $c/f_m'$ or less (an accuracy that equals the second synthetic wavelength or less) of the synthetic wavelength (second synthetic wavelength) of the synthetic wavelengths (first synthetic wavelength) of the optical frequency combs OC1 and OC3. Then, the geometric distance D can be set to several meters to several tens of meters by appropriately selecting $f_{m1}$ and $f_{m2}$, and therefore practically need not be measured in advance.

To correct a change in medium density from the optical path length measurement results for a plurality of wavelengths, the geometric distance D is calculated by fitting a given function to the optical path length measurement results. Letting $OP_{meas}(f_p)$ be the measured optical path length, a square sum J of a fitting residual is given by:

$$J = \sum_{i=1}^{n} \{OP_{meas}(f_i) - (D + N_{tp} \cdot D \cdot B(f_i) + N_f \cdot D \cdot C(f_i))\}^2. \quad (26)$$

In view of this, D, $N_{tp}\cdot D$, and $N_f\cdot D$ that minimize the value of equation (26) can be determined by solving given normal equations.

Figure 9:
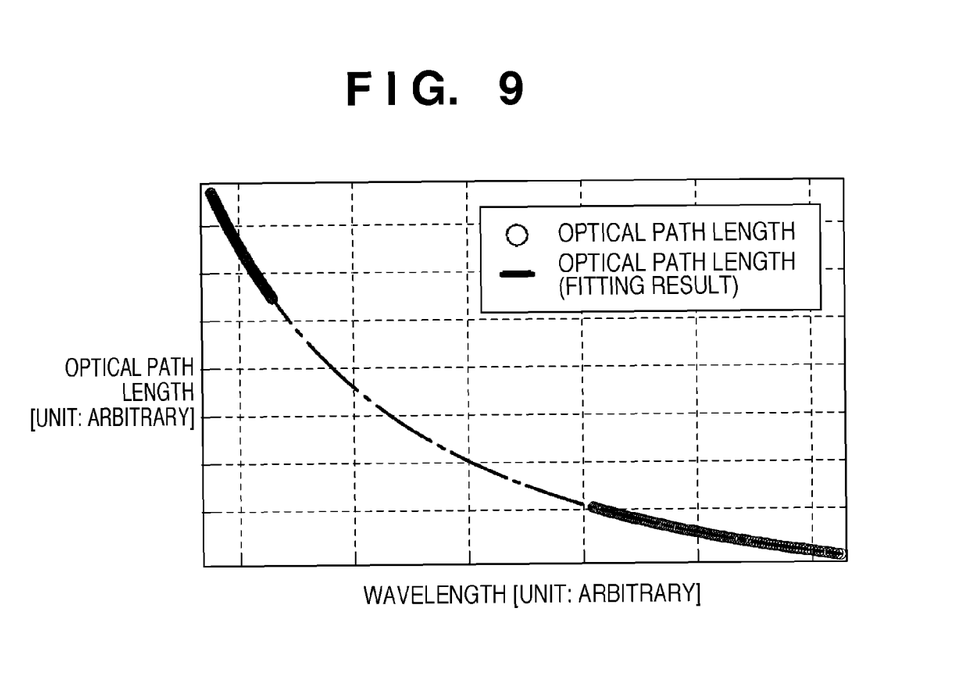
FIG. 9 is a graph showing the result of fitting a given function to the measured optical path length.

FIG. 9 shows the result of fitting a given function to the measured optical path length. Referring to FIG. 9, the wavelength range of the optical path length measurement result is widened by additionally providing the light source 132. In this state, D, $N_{tp}\cdot D$, and $N_f\cdot D$ can be obtained by optimally approximating a discrete optical path length measurement result, indicated by open circles, using equation (15) indicated by an alternate long and short dashed line.

In this manner, the measurement apparatus 1A according to this embodiment not only improves the measurement accuracy by increasing the measurement frequency and the diffractive index dispersion by additionally providing the light source 132, but also takes account of a fluctuation with respect to the humidity. Hence, the measurement apparatus 1A can measure (calculate) the geometric distance D with high accuracy even under an environment in which the humidity greatly changes. Also, the measurement apparatus 1A can measure (determine) the absolute value of the geometric distance D with high accuracy by eliminating any uncertainty of an integer multiple of each wavelength, without measuring the geometric distance D in advance, by appropriately selecting $f_{m1}$ and $f_{m2}$.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-283731 filed on Nov. 4, 2008, which is hereby incorporated by reference herein in its entirety.

What is claimed is:

1. A measurement apparatus configured to measure a distance between a reference surface fixed on a fiducial surface and a test surface located on a test object, the apparatus comprising:
an optical frequency comb generation unit configured to generate a light beam with a plurality of optical frequency components, which have equal optical frequency separations therebetween;
a detection unit configured, for at least two of the plurality of optical frequency components, to detect an interference signal between a portion of the light beam reflected by the reference surface and a portion of the light beam reflected by the test surface to detect a phase corresponding to an optical path length between the reference surface and the test surface; and
a calculation unit configured to calculate a geometric distance between the reference surface and the test surface based on the phases detected by said detection unit, wherein
for each of the plurality of optical frequency components, said calculation unit is configured to calculate the geometric distance by converting the phase detected by said detection unit into an optical path length, and fitting a function to the optical path length, and wherein
the function is expressed by the geometric distance and amount of change in optical length obtained by multiplying the refractive index of a medium, which is present between the reference surface and the test surface and has a known dispersion characteristic, by the geometric distance.

2. The apparatus according to claim 1, wherein said optical frequency comb generation unit is configured to set the plurality of optical frequency components so as to generate a plurality of phase differences at equal intervals within a range of $2\pi$ as the optical frequency components propagate through the geometric distance.

3. The apparatus according to claim 2, wherein said plurality of optical frequency components are set within an optical frequency range in which a cyclic error of the measurement apparatus falls within a predefined tolerance.

4. The apparatus according to claim 1, wherein
said optical frequency comb generation unit includes at least one optical frequency comb generation unit set including a first unit and second unit configured to generate light beams having different center optical frequencies and optical frequency separations, and
said detection unit is configured to detect an interference signal between a light beam which is generated by said first unit, and reflected by the test surface, and a light beam generated by said second unit, and reflected by the reference surface.

5. The apparatus according to claim 1, wherein
said calculation unit is configured to:
calculate a phase difference ($\Delta\phi$) between two adjacent optical frequency components detected by said detection unit,
determine an order of interference (n1) of the interference signal detected by said detection unit for each of the plurality of optical frequency components ($f_p$), the determination being based on a synthetic wavelength obtained by dividing the velocity of light (c) by the optical frequency separation ($f_m$), a distance obtained by multiplying the phase difference by the velocity of light, and a distance (D') between the reference surface and the test surface measured in advance with an accuracy not less than the synthetic wavelength ($c/f_m$), and
calculates the geometric distance using the order of interference.

6. The apparatus according to claim 5, wherein the order of interference ($n_1$) is determined using the formula:

$$n1 = \text{round}\left(\left(D' - \frac{\Delta\phi}{2\pi}\frac{c}{f_m}\right) / \frac{c}{f_m}\right),$$

wherein round is a function rounding the result of the formula to the nearest integer.

7. The apparatus according to claim 1, wherein
said optical frequency comb generation unit includes a plurality of optical frequency comb generation unit sets each including a first unit and second unit configured to generate light beams having different center optical frequencies and optical frequency separations.

8. The apparatus according to claim 1, wherein said optical frequency comb generation unit is configured to generate a light beam having at least three different optical frequency separations.

9. The apparatus according to claim 1, wherein
said calculation unit is configured to:
calculate a phase difference between two adjacent optical frequency components detected by said detection unit,
determine an order of interference of the interference signal, detected by said detection unit for at least two of the plurality of optical frequency components, the determination being based on first synthetic wavelengths obtained by dividing the velocity of light by the optical frequency separations, a second synthetic wavelength obtained by synthesizing the first synthetic wavelengths, a distance obtained by multiplying the amount of change between phases by the velocity of light, and a distance between the reference surface and the test surface measured in advance with an accuracy not less than the second synthetic wavelength, and
calculate the geometric distance using the order of interference.

10. The apparatus according to claim 1, wherein the known dispersion characteristic is approximated by a sum of a refractive index, in a vacuum, of the medium between the reference surface and the test surface and a product of a component which depends on a density of the medium between the reference surface and the test surface and a component which depends on the optical frequency component.

11. The apparatus according to claim 10, wherein the known dispersion characteristic is further approximated by a product of a component which depends on a humidity of the medium between the reference surface and the test surface and the component which depends on the optical frequency component.

12. The apparatus according to claim 1, wherein said calculation unit is further configured to calculate a refractive index of the medium between the reference surface and the test surface by dividing optical path lengths for the plurality of optical frequency components by the geometric distance.

13. The apparatus according to claim 1, wherein the function is expressed by a sum of the geometric distance and the amount of change in optical path length attributed to the refractive index of the medium between the reference surface and the test surface.

* * * * *